United States Patent
Wu et al.

(10) Patent No.: US 11,553,475 B2
(45) Date of Patent: Jan. 10, 2023

(54) SUPERPOSITION TRANSMISSION OF SIDELINK AND UPLINK

(71) Applicant: QUALCOMM Incorporated, San Diego, CA (US)

(72) Inventors: Shuanshuan Wu, San Diego, CA (US); Anantharaman Balasubramanian, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 46 days.

(21) Appl. No.: 16/999,972

(22) Filed: Aug. 21, 2020

(65) Prior Publication Data

US 2022/0061030 A1 Feb. 24, 2022

(51) Int. Cl.
*H04W 72/04* (2009.01)
*H04W 52/34* (2009.01)
*H04W 52/14* (2009.01)

(52) U.S. Cl.
CPC ....... *H04W 72/042* (2013.01); *H04W 52/146* (2013.01); *H04W 52/34* (2013.01); *H04W 72/0413* (2013.01)

(58) Field of Classification Search
CPC . H04W 72/042; H04W 52/146; H04W 52/34; H04W 72/0413
See application file for complete search history.

(56) References Cited

U.S. PATENT DOCUMENTS

| | | | |
|---|---|---|---|
| 10,404,504 B2* | 9/2019 | Yuan | H04L 27/0008 |
| 2015/0312074 A1* | 10/2015 | Zhu | H04W 52/16 370/329 |
| 2015/0351081 A1* | 12/2015 | Zhu | H04J 11/003 370/329 |
| 2016/0309542 A1* | 10/2016 | Kowalski | H04W 72/042 |
| 2016/0316513 A1* | 10/2016 | Lee | H04L 5/0023 |
| 2016/0337879 A1* | 11/2016 | Hwang | H04W 72/1231 |
| 2017/0367054 A1* | 12/2017 | Kim | H04L 1/0003 |
| 2018/0123669 A1* | 5/2018 | Xi | H04W 72/121 |
| 2018/0131472 A1* | 5/2018 | Xi | H04L 25/03006 |
| 2019/0029031 A1* | 1/2019 | Kumar | H04W 72/1284 |
| 2019/0068274 A1* | 2/2019 | Han | H04B 7/15528 |
| 2019/0068342 A1* | 2/2019 | Kumar | H04L 5/0048 |
| 2019/0253845 A1* | 8/2019 | Makki | H04L 5/006 |
| 2019/0254043 A1* | 8/2019 | Makki | H04W 72/121 |
| 2019/0268885 A1* | 8/2019 | Atungsiri | H04L 25/0202 |

(Continued)

*Primary Examiner* — Ayaz R Sheikh
*Assistant Examiner* — Tarell A Hampton
(74) *Attorney, Agent, or Firm* — Danai Nelisile Mhembere; Norton Rose Fulbright LLP

(57) ABSTRACT

In one aspect, a method of wireless communication includes receiving, by a user equipment (UE), a downlink control signaling scheduling one or more uplink transmissions for one or more transmission resources. The method also includes determining, by the UE, to perform superposition transmission operations for at least one transmission resource of the one or more transmission resources. The method further includes transmitting, by the UE, an uplink channel data transmission and a sidelink channel data transmission in a same transmission resource, responsive to determining to perform superposition transmission operations for the least one transmission resource. Other aspects are described and claimed.

30 Claims, 10 Drawing Sheets

(56) References Cited

U.S. PATENT DOCUMENTS

| | | | | |
|---|---|---|---|---|
| 2020/0187248 A1* | 6/2020 | Lee | ............. | H04W 72/04 |
| 2020/0204971 A1* | 6/2020 | Yasukawa | ............. | H04W 4/70 |
| 2020/0244407 A1* | 7/2020 | Makki | ............. | H04L 1/1825 |
| 2020/0389881 A1* | 12/2020 | Matsuda | ............. | H04L 5/001 |
| 2021/0045181 A1* | 2/2021 | Li | ............. | H04L 5/0005 |
| 2021/0067300 A1* | 3/2021 | Pan | ............. | H04L 5/006 |
| 2021/0075539 A1* | 3/2021 | Makki | ............. | H04L 1/0013 |
| 2021/0083793 A1* | 3/2021 | Makki | ............. | H04B 17/309 |
| 2021/0083828 A1* | 3/2021 | Matsuda | ............. | H04W 72/04 |
| 2021/0184909 A1* | 6/2021 | Han | ............. | H04L 27/3488 |
| 2021/0376974 A1* | 12/2021 | Makki | ............. | H04B 1/10 |

* cited by examiner

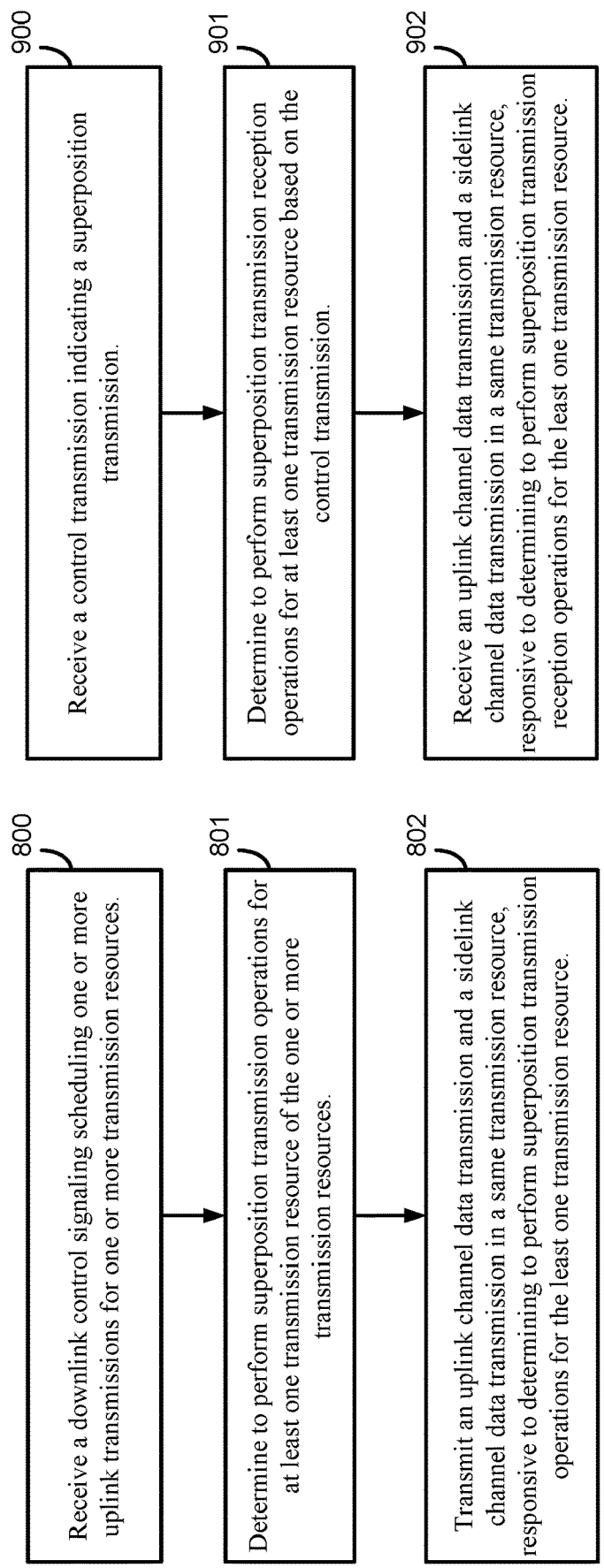

SUPERPOSITION TRANSMISSION OF SIDELINK AND UPLINK

BACKGROUND

Field

Aspects of the present disclosure relate generally to wireless communication systems, and more particularly, to techniques for improving bandwidth usage. Certain embodiments of the technology discussed below can enable superposition of transmissions.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes receiving, by a user equipment (UE), a downlink control signaling scheduling one or more uplink transmissions for one or more transmission resources; determining, by the UE, to perform superposition transmission operations for at least one transmission resource of the one or more transmission resources; and transmitting, by the UE, an uplink channel data transmission and a sidelink channel data transmission in a same transmission resource, responsive to determining to perform superposition transmission operations for the least one transmission resource.

In an additional aspect of the disclosure, a method of wireless communication includes receiving, by a user equipment (UE), a control transmission indicating a superposition transmission; determining, by the UE, to perform superposition transmission reception operations for at least one transmission resource based on the control transmission; and receiving, by the UE, an uplink channel data transmission and a sidelink channel data transmission in a same transmission resource, responsive to determining to perform superposition transmission reception operations for the least one transmission resource The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 8 is a block diagram illustrating example blocks executed by a UE.

FIG. 9 is a block diagram illustrating another example of blocks executed by a UE.

DETAILED DESCRIPTION

Figure 1:
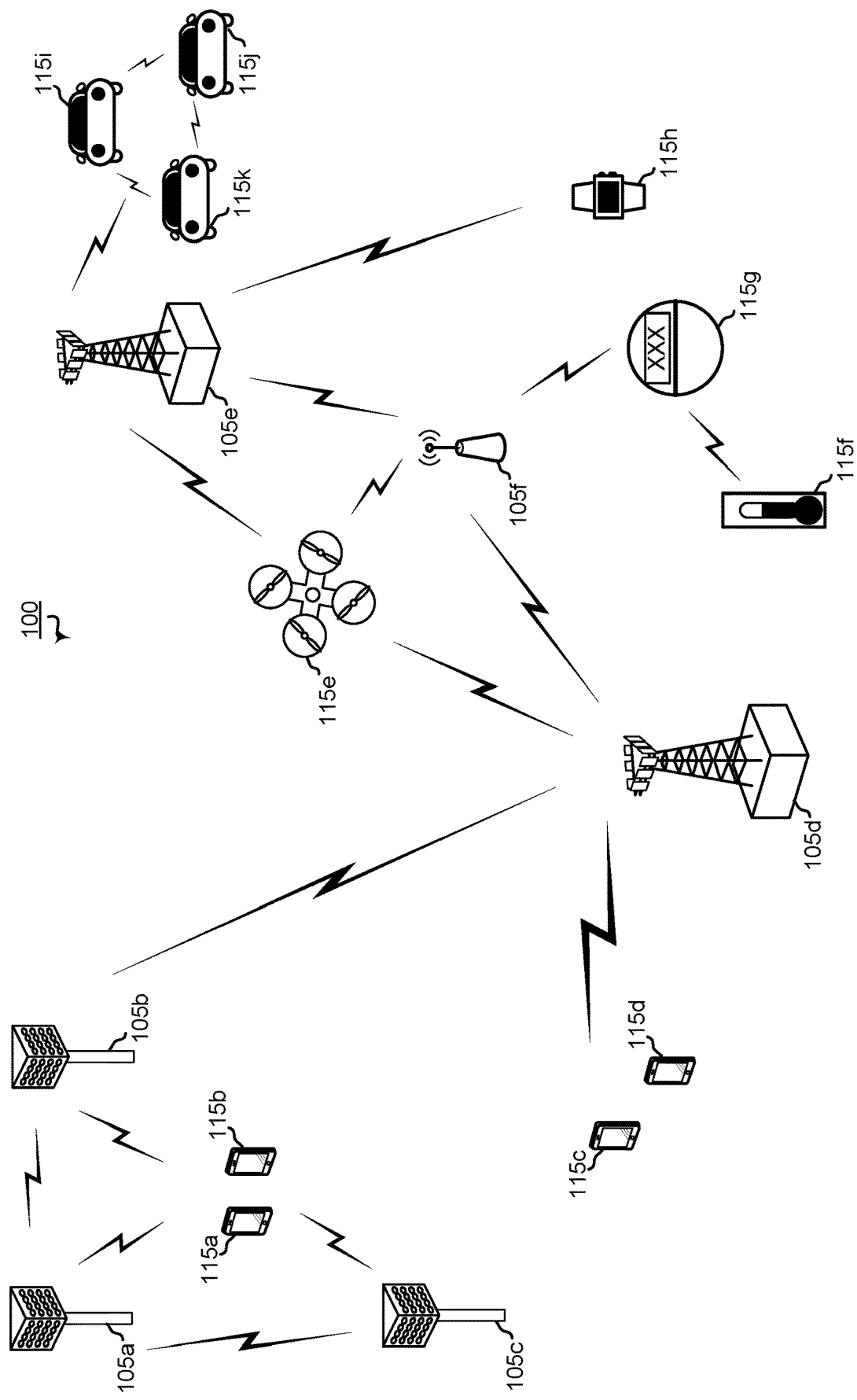
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting.

Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
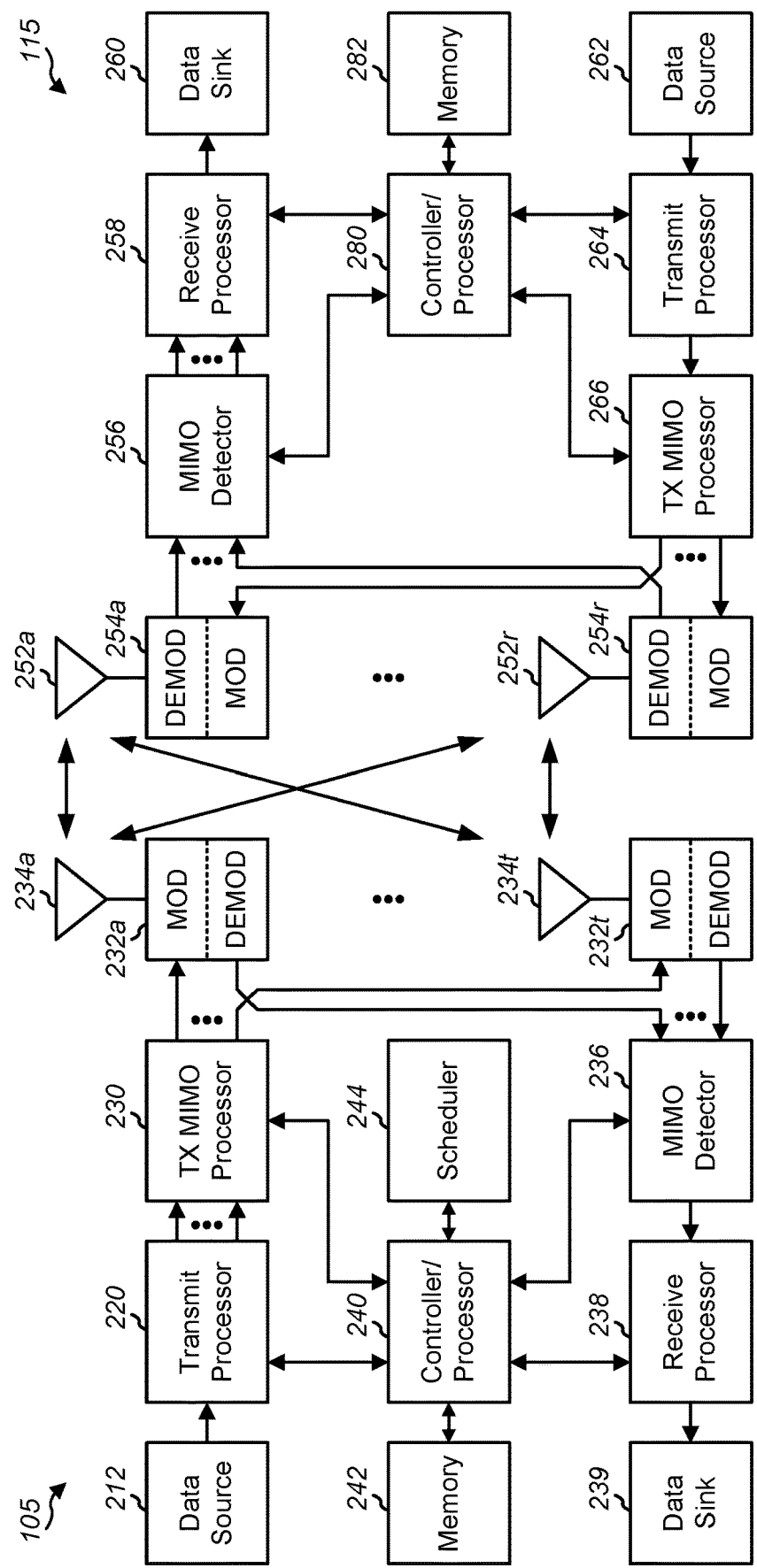
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 8 and 9, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5 g network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or a 25-µs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Sidelink communication, also referred to as sidelink channel communication, may be enabled in a cellular network. Sidelink communication includes direct device communication such as device-to-device, vehicle-to-vehicle, etc. In some implementations, for sidelink communication a transmitting device (e.g., UE (may communicate on a sidelink by performing autonomous resource allocation.

In autonomous resource allocation, a transmitting device can select resources for sidelink transmission on its own, as opposed to uplink and downlink communications which are generally scheduled by a central scheduling device, e.g., a network device, such as a base station). The resource selection for autonomous resource allocation can be random, or based on sensing/LBT, e.g. the UE selects the unused/unreserved resource from a resource pool that is configured for sidelink communication for its transmission(s).

For example, in LTE or NR sidelink, some of the uplink resources are able to be used (or repurposed/reconfigured) for sidelink communication. Such (re)configured resources form one or multiple resource pools; a transmitting device (e.g., UE) may transmit in the resource pool based on autonomous resource allocation.

In current LTE or NR specs, the sidelink communications are TDM and/or FDM with cellular uplink transmissions. Meaning that, the resources used for cellular uplink communications and sidelink communications are orthogonal to one another.

However, such current sidelink communication mechanisms, such as those currently specified or proposed in LTE or NR V2X, do not make efficient use of resources and can be improved.

Generally, uplink transmission and sidelink transmission may have imbalanced transmission powers. For example, unlike sidelink communication, which may be performed between peer UEs that are close to each other, UEs in uplink transmission are usually relatively farther away from the base station that is receiving the uplink transmission. As a result, uplink transmissions may have substantially higher power than sidelink transmissions. To improve the system performance by leveraging the power difference, a UE's uplink transmission and sidelink transmission can be superimposed on top of one another. Said another way, a UE's uplink transmission and sidelink transmission may be sent using the same time and frequency resource in a single transmission and received successfully by another device, if transmission powers of the two transmissions are different (e.g., substantially different). Such superposition of sidelink and uplink transmission may be referred to as multi-user superposition transmission (MUST), or non-orthogonal multiple access (NOMA). Such superposition of sidelink and uplink is feasible given that such links are likely to have a difference in signal power (e.g., transmission power).

Although the above has been described with a focus on autonomous sidelink transmission (i.e., base station does not do resource allocation for the sidelink transmission), in other implementations the sidelink channel may not be autonomous (i.e., the base station may reserve resources for the sidelink channel or channels and may optionally schedule the use of such sidelink channel resources).

In superposition transmission operations the uplink channel may be referred to as a base layer (e.g., more power may be allocated to uplink channel) and the sidelink channel may be referred to as the enhanced layer (e.g., less power is allocated to the sidelink channel). Such that, receiver of the base layer (e.g., base station) may decode the base layer directly from the received transmission, without caring about the enhanced layer transmission or the superposition transmission; while receiver of the enhanced layer (e.g., another UE) may have to decode the base layer first, and then be able to decode the enhanced layer based on decoding of the base layer.

As an illustrative example, a transmitting UE may determine to perform a MUST when it has both sidelink and uplink traffic, and the UE's transmission powers on the two links are substantially different. When the UE performs a MUST, it may transmit sidelink control information to receiver UE(s); the sidelink control information indicates that the transmission is a superposition transmission.

A sidelink receiving UE may receive the sidelink transmissions from the transmitting UE. If the sidelink control information indicates the sidelink transmission to be the enhanced layer in the MUST, the receiver UE decodes base layer (uplink) first, and then perform successive interference cancellation (SIC) to decode the enhanced layer (sidelink).

For an uplink receiving base station, the MUST may be transparent to the base station. That is, that although the BS may schedule the transmitting UE's uplink transmission, the base station may not be aware that the transmitting UE is doing the MUST. In such implementations, the base station just decodes uplink transmission from the transmitting UE as normal.

Alternatively, the MUST may be known at the base station, for example, the transmitting UE may notify the base station, or may request coordination/resource allocation from the base station for the MUST. In one example, the transmitting UE may send an uplink signaling to the base station and request that the base station schedule the MUST. In another example, the base station may monitor sidelink control signaling transmitted by the UE, where the sidelink control signaling may be scheduling a sidelink transmission; the base station may decide to schedule the UE's uplink transmission in the same resource that is scheduled for sidelink transmission, so the UE may transmit sidelink and uplink in a superposition transmission. The base station then sends a downlink control channel transmission approving and/or scheduling the must to the transmitting UE, or to the transmitting UE and the receiving UE.

Figure 3:
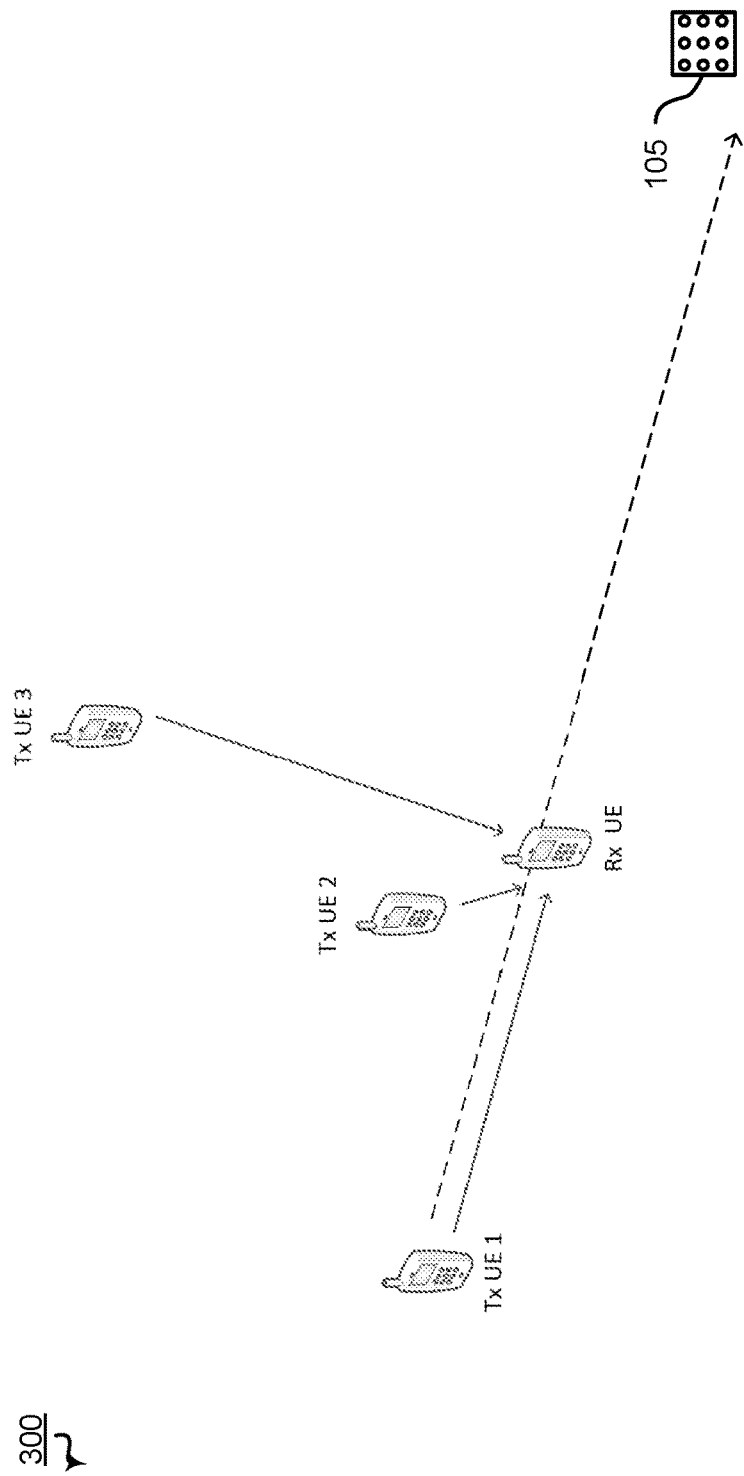
FIG. 3 illustrates a diagram depicting examples of sidelink communications and uplink communications.

Referring to FIG. 3, FIG. 3 illustrates an example diagram 300 that illustrates example sidelink communications and superposition communications in a wireless network. Referring to FIG. 3, the diagram 300 illustrates a wireless network that includes a base station and multiple UEs. Of the multiple UEs, 3 are transmitting UEs and 1 is a receiving UE in the example of FIG. 3.

Transmissions between the devices of the wireless network are also illustrated in FIG. 3. In the example of FIG. 3, sidelink transmission are illustrated between the UE devices in solid lines and an uplink transmission is illustrated between a particular UE device (Tx UE 1) and a network device, a base station 105 in the example of FIG. 3, as a dashed line.

The example shown in FIG. 3 further illustrates an exemplary and likely scenario where a cluster of UE devices may be near each other or relatively closer to each other when compared to the distances between the UE devices and the network device, e.g., base station 105. As such, the uplink transmission (dashed line) may utilize a higher transmission power than the transmission powers of the sidelink transmissions. Because of the difference (e.g., a possible relatively large difference) in transmission powers and because such uplink and sidelink transmission may be orthogonal to one another, the uplink and sidelink transmissions from the first UE (Tx UE 1) may be transmitted in a same transmission resource. Additionally, in the example of FIG. 3, the uplink and sidelink transmissions which may be transmitted as a combined superposition transmission have a same general direction. However, in other implementations, the uplink and sidelink transmissions may have different directions.

Figure 4:
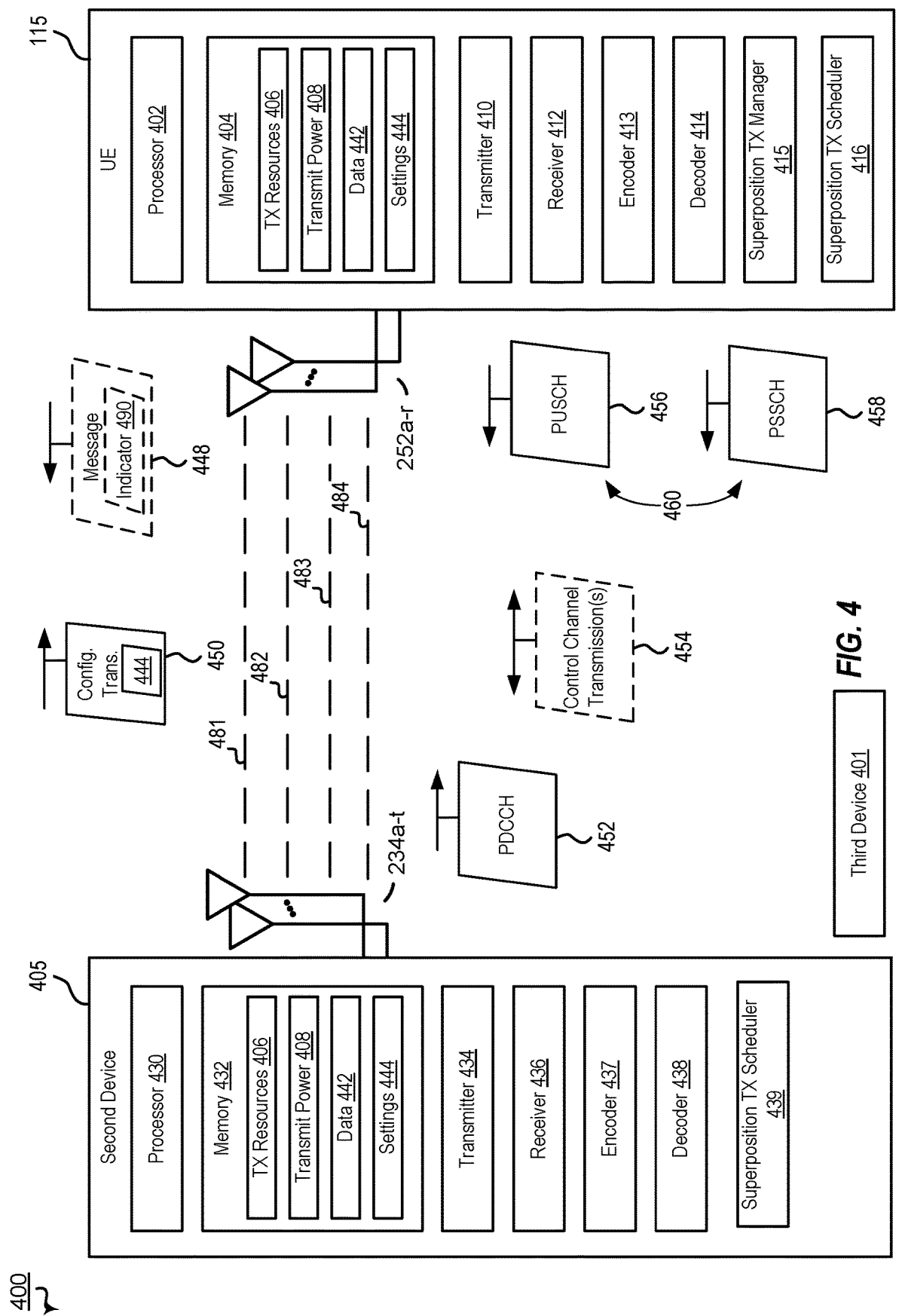
FIG. 4 is a block diagram illustrating an example of a wireless communications system that enables superposition of sidelink communications and uplink communications.

FIG. 4 illustrates an example of a wireless communications system 400 that supports superposition of uplink and sidelink channel transmissions in accordance with aspects of the present disclosure. In some examples, wireless communications system 400 may implement aspects of wireless communication system 100. For example, wireless communications system 400 may include UE 115, network entity 405, and a third device 401. Superposition of uplink and sidelink channel transmission operations may increase throughput and reduce latency by sending more data (e.g., two transmissions) in a single transmission resource. Thus, network and device performance can be increased.

Network entity 405, UE 115, and third device 401 may be configured to communicate via frequency bands, such as FR1 having a frequency of 410 to 7125 MHz or FR2 having a frequency of 24250 to 52600 MHz for mm-Wave. It is noted that sub-carrier spacing (SCS) may be equal to 15, 30, 60, 120 or 240 kHz for some data channels. Network entity 405 and UE 115 may be configured to communicate via one or more component carriers (CCs), such as representative first CC 481, second CC 482, third CC 483, and fourth CC 484. Although four CCs are shown, this is for illustration only, more or fewer than four CCs may be used. One or more CCs may be used to communicate control channel transmissions, data channel transmissions, and/or sidelink channel transmissions.

Such transmissions may include a Physical Downlink Control Channel (PDCCH), a Physical Downlink Shared Channel (PDSCH), a Physical Uplink Control Channel (PUCCH), a Physical Uplink Shared Channel (PUSCH), a Physical Sidelink Control Channel (PSCCH), a Physical Sidelink Shared Channel (PSSCH), or a Physical Sidelink Feedback Channel (PSFCH). Such transmissions may be scheduled by aperiodic grants and/or periodic grants.

Each periodic grant may have a corresponding configuration, such as configuration parameters/settings. The periodic grant configuration may include configured grant (CG) configurations and settings. Additionally, or alternatively, one or more periodic grants (e.g., CGs thereof) may have or be assigned to a CC ID, such as intended CC ID.

Each CC may have a corresponding configuration, such as configuration parameters/settings. The configuration may include bandwidth, bandwidth part, HARQ process, TCI state, RS, control channel resources, data channel resources, or a combination thereof. Additionally, or alternatively, one or more CCs may have or be assigned to a Cell ID, a Bandwidth Part (BWP) ID, or both. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC may also have corresponding management functionalities, such as, beam management, BWP switching functionality, or both. In some implementations, two or more CCs are quasi co-located, such that the CCs have the same beam and/or same symbol.

In some implementations, control information may be communicated via network entity 405 and UE 115. For example, the control information may be communicated suing MAC-CE transmissions, RRC transmissions, DCI, transmissions, another transmission, or a combination thereof.

UE 115 can include a variety of components (e.g., structural, hardware components) used for carrying out one or more functions described herein. For example, these components can includes processor 402, memory 404, transmitter 410, receiver 412, encoder, 413, decoder 414, superposition transmission manager 415, superposition transmission scheduler 416, and antennas 252a-r. Processor 402 may be configured to execute instructions stored at memory 404 to perform the operations described herein. In some implementations, processor 402 includes or corresponds to controller/processor 280, and memory 404 includes or corresponds to memory 282. Memory 404 may also be configured to store transmission resources data 406, transmit power data 408, data 442, settings data 444, or a combination thereof, as further described herein.

The transmission resources data 406 includes or corresponds to data associated with or corresponding to transmission resources and the allocation thereof. For example, the transmission resources data 406 may include resource pools for uplink communications, resource pools for sidelink communications, and/or allocated resources for uplink communications. The transmission resources data 406 may include transmission resources for a single triggered or aperiodic grant or a set of transmission resources for a set of periodic grants.

The transmit power data 408 includes or corresponds to data indicating or corresponding to transmit powers for uplink communications, sidelink communications, or both.

For example, the transmit power data 408 may include or correspond to transmission powers and/or transmission power settings for uplink communications and for sidelink communications.

The data 442 includes or corresponds to data which is to be transmitted by the device. The data 442 may include or correspond to data for uplink communications, sidelink communications, or both. The settings data 444 includes or corresponds to data associated with superposition transmissions of uplink and sidelink transmissions. The settings data 444 may include one or more thresholds (e.g., threshold values) for superposition transmissions of uplink and sidelink transmissions modes, mode selection, or a combination thereof.

Transmitter 410 is configured to transmit data to one or more other devices, and receiver 412 is configured to receive data from one or more other devices. For example, transmitter 410 may transmit data, and receiver 412 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 410 and receiver 412 may be replaced with a transceiver. Additionally, or alternatively, transmitter 410, receiver, 412, or both may include or correspond to one or more components of UE 115 described with reference to FIG. 2.

Encoder 413 and decoder 414 may be configured to encode and decode data for transmission. Decoder 414 may be configured to perform successive interference cancelation (SIC). For example, decoder 414 may be configured to decode an enhanced or lower power layer based on a base or higher power layer. To illustrate, decoder 414 may decode an uplink channel transmission in a particular transmission resource and then decoder a sidelink channel transmission in the particular transmission resource based on the decoding of the uplink channel transmission. In a particular example, the stronger uplink signal is decoded first and then subtracted from the combined signal to produce a difference or delta signal which is then then decoded as the weaker sidelink signal.

Superposition transmission manager 415 may be configured to determine and perform superposition transmission operations. For example, the superposition transmission manager 415 may be configured to determine whether to perform superposition transmission, such as whether superposition transmission is capable or feasible. Additionally, the superposition transmission manager 415 may determine a particular type of superposition transmission to use. To illustrate, the superposition transmission manager 415 may determine whether to use UE/device scheduling or network scheduling.

Superposition transmission scheduler 416 may be configured to schedule superposition transmissions. For example, superposition transmission scheduler 416 is configured to select a particular transmission resource for the superposition transmission. To illustrate, superposition transmission scheduler 416 is configured to determine to use a transmission resource in or out of a sidelink resource pool. The superposition transmission scheduler 416 may be further configured to signal such a scheduled superposition transmission or request that another device schedule the superposition transmission. Third device 401 may include or correspond to a second terminal or user device, such as a second UE. Additionally, third device 401 may include one or more components and/or software as described with reference to UE 115.

Network entity 405 includes processor 430, memory 432, transmitter 434, receiver 436, encoder 437, decoder 438, superposition transmission scheduler 439, and antennas 234a-t. Processor 430 may be configured to execute instructions stores at memory 432 to perform the operations described herein. In some implementations, processor 430 includes or corresponds to controller/processor 240, and memory 432 includes or corresponds to memory 242. Memory 432 may be configured to store measurement information data 406, surrounding beam information data 408, notification data 442, settings data 444, or a combination thereof, similar to the UE 115 and as further described herein.

Transmitter 434 is configured to transmit data to one or more other devices, and receiver 436 is configured to receive data from one or more other devices. For example, transmitter 434 may transmit data, and receiver 436 may receive data, via a network, such as a wired network, a wireless network, or a combination thereof. For example, network entity 405 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 434 and receiver 436 may be replaced with a transceiver. Additionally, or alternatively, transmitter 434, receiver, 436, or both may include or correspond to one or more components of network entity 405 described with reference to FIG. 2.

Encoder 437, and decoder 438 may include the same functionality as described with reference to encoder 413 and decoder 414, respectively. Superposition transmission scheduler 439 may include similar functionality as described with reference to superposition transmission scheduler 416. For example, the superposition transmission scheduler 439 may be configured to schedule a particular superposition transmission, such as select a particular transmission resource for the superposition transmission or approve or confirm a requested or suggested transmission resource for the superposition transmission.

During operation of wireless communications system 400, network entity 405 may determine that UE 115 has superposition transmission capability. For example, UE 115 may transmit a message 448 that includes a superposition transmission indicator 490. Indicator 490 may indicate superposition transmission capability or a particular type or mode of superposition transmission. In some implementations, network entity 405 sends control information to indicate to UE 115 that superposition transmission and/or a particular type of superposition transmission is to be used. For example, in some implementations, message 448 (or another message, such as configuration transmission 450) is transmitted by the network entity 405. The configuration transmission 450 may include or indicate to use superposition transmission or to adjust or implement a setting of a particular type of superposition transmission.

During operation, devices of wireless communications system 400, perform superposition transmission from user devices. Superposition transmission may occur between multiple devices of the network. For example, a network entity 405 may transmit a a PDCCH transmission 452 to the UE 115 allocating (e.g., indicating or granting) one or more transmission resources to the UE 115, such as for uplink transmission. In some implementations, the PDCCH transmission 452 is a DCI.

After receiving the PDCCH transmission 452, the UE 115 may decoded the PDCCH transmission 452 to determine the one or more transmission resources (e.g., the transmission resources data 406). The UE 115 may determine whether to perform superposition transmissions. For example, the UE 115 may determine whether it has uplink data and sidelink data to send from data 442 in the one or more allocated transmission resources. The UE may further use transmission power data for uplink and sidelink transmission to determine whether to perform superposition transmission. To illustrate, the UE 115 may determine whether the uplink transmission power is different (e.g., substantially different) from the sidelink transmission power, such as greater than. For example, the UE determines uplink transmission power based on path loss measurement (between network entity and the UE), and/or, based on power control signaling from the network entity. The UE may also determine sidelink transmission power based on path loss measurement (between another receiver UE and the UE); the UE may determine whether the transmission power in uplink is greater than sidelink transmission power plus a threshold. If it is, the UE may determine to perform superposition transmission.

The UE 115 and network entity 405 may optionally exchange one or more control channel transmissions 454 to schedule the superposition transmission responsive to the UE 115 determining to perform superposition transmission. In some implementations the UE 115 schedules the superposition transmission. In other implementations, the UE 115 requests the network entity 405 to schedule the superposition transmission. For example, the UE 115 may send a PUCCH transmission or a PSCCH transmission to request or schedule the superposition transmission. The network entity 405 may respond with a second PDCCH transmission when the UE 115 requests approval or scheduling assistance. Examples of control channel signaling and scheduling are described further with reference to FIGS. 5-7.

After the superposition transmission is scheduled, the UE 115 transmits the superposition transmission. As illustrated in the example of FIG. 4, the UE 115 transmits a PUSCH transmission 456 and a PSSCH transmission 480 in a particular transmission resource, which make up a particular superposition transmission 460.

The network entity 405 and the third device 401 receive and decode one or more transmissions (456, 458) of the superposition transmission 460. For example, the network entity 405 may only receive the PUSCH transmission 456 based on transmission power and distances and/or may choose to only decode the PUSCH transmission 456 based on an intended recipient of the PUSCH transmission 456. Additionally, or alternatively, the third device 401 may determine to decode both transmissions (456 and 458) of the superposition transmission 460. To illustrate, the third device 401 may perform SIC to decode the PSSCH transmission 458. Thus, the third device 401 may receive two data transmissions in a particular transmission resource. Such operations may increase (e.g., double) throughput and reduce latency.

As illustrated in the example of FIG. 4, the UE 115 generates and transmits data to multiple devices or more data to the third device and/or network using superposition of sidelink and uplink transmission. Accordingly, superposition of sidelink and uplink transmissions increases (e.g., doubles) throughput and reduces latency.

Therefore, FIG. 4 describes superposition of sidelink and uplink transmission operations. Using superposition of sidelink and uplink transmission operations may enable increased network efficiency and utilization. Performing superposition of sidelink and uplink transmission operations enables enhanced UE and network performance.

Figure 5:
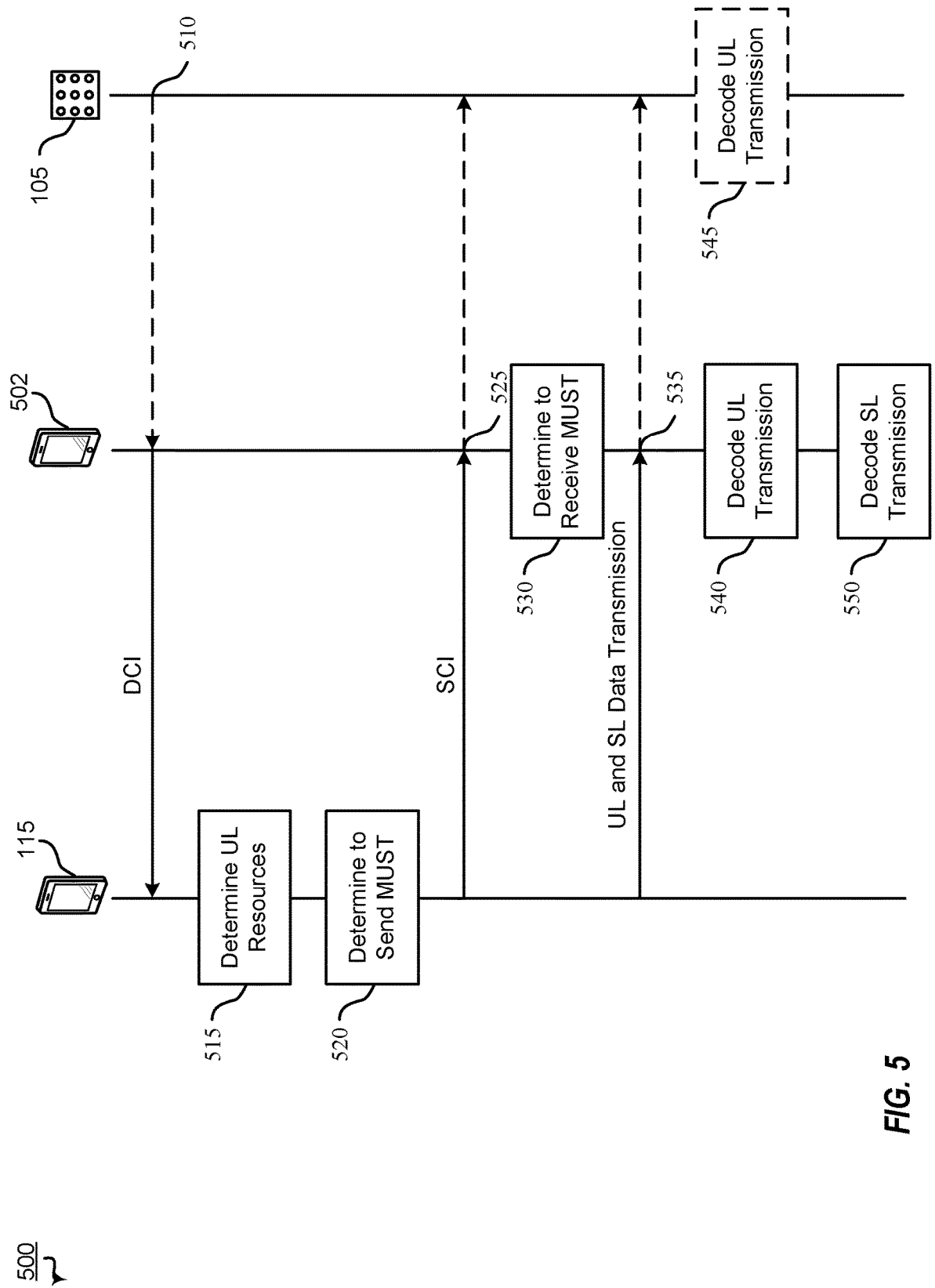
FIG. 5 is a ladder diagram illustrating an example of a process flow for a first example of superposition of sidelink communications and uplink communications.
Figure 6:
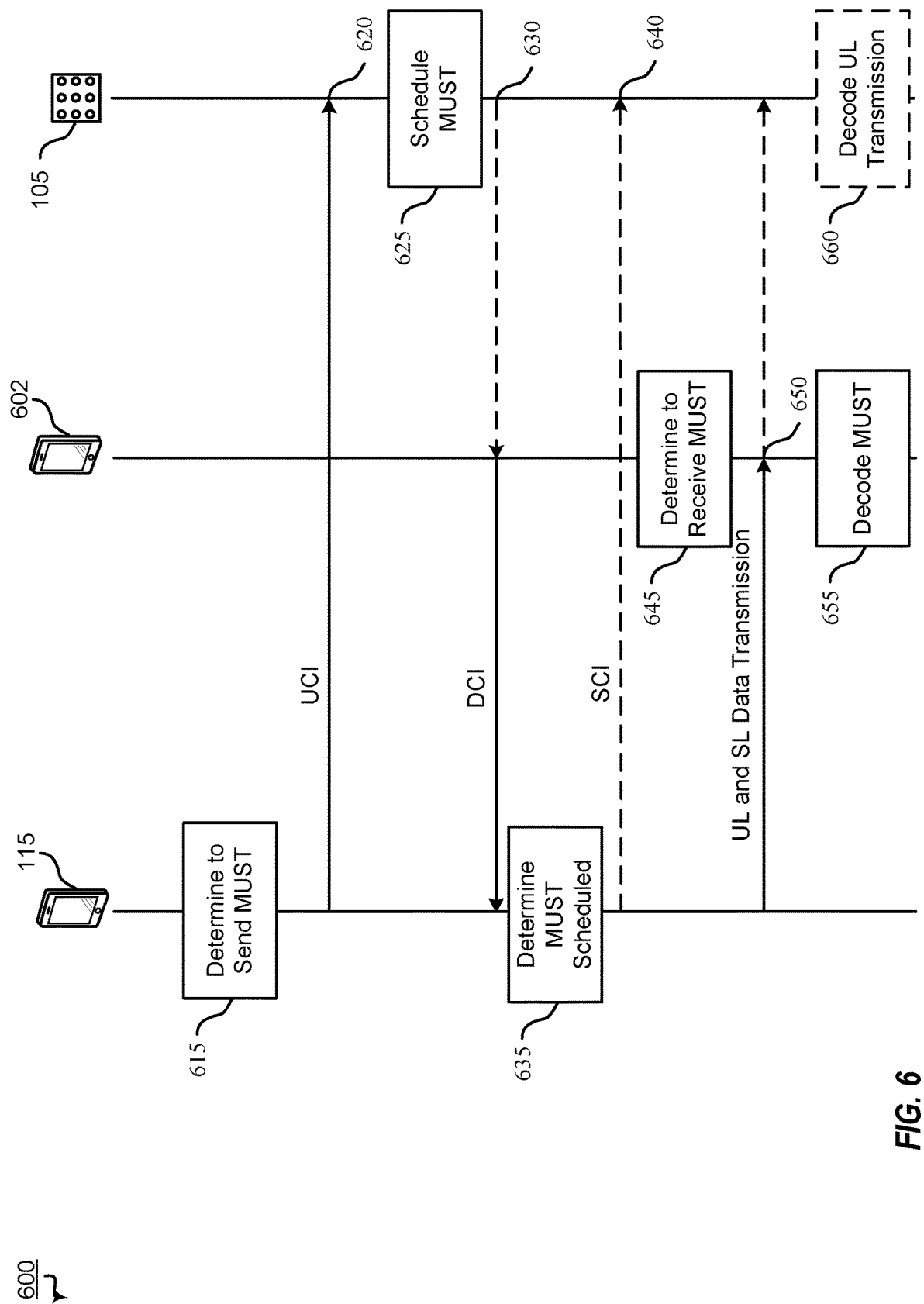
FIG. 6 is a ladder diagram illustrating an example of a process flow for a second example of superposition of sidelink communications and uplink communications.
Figure 7:
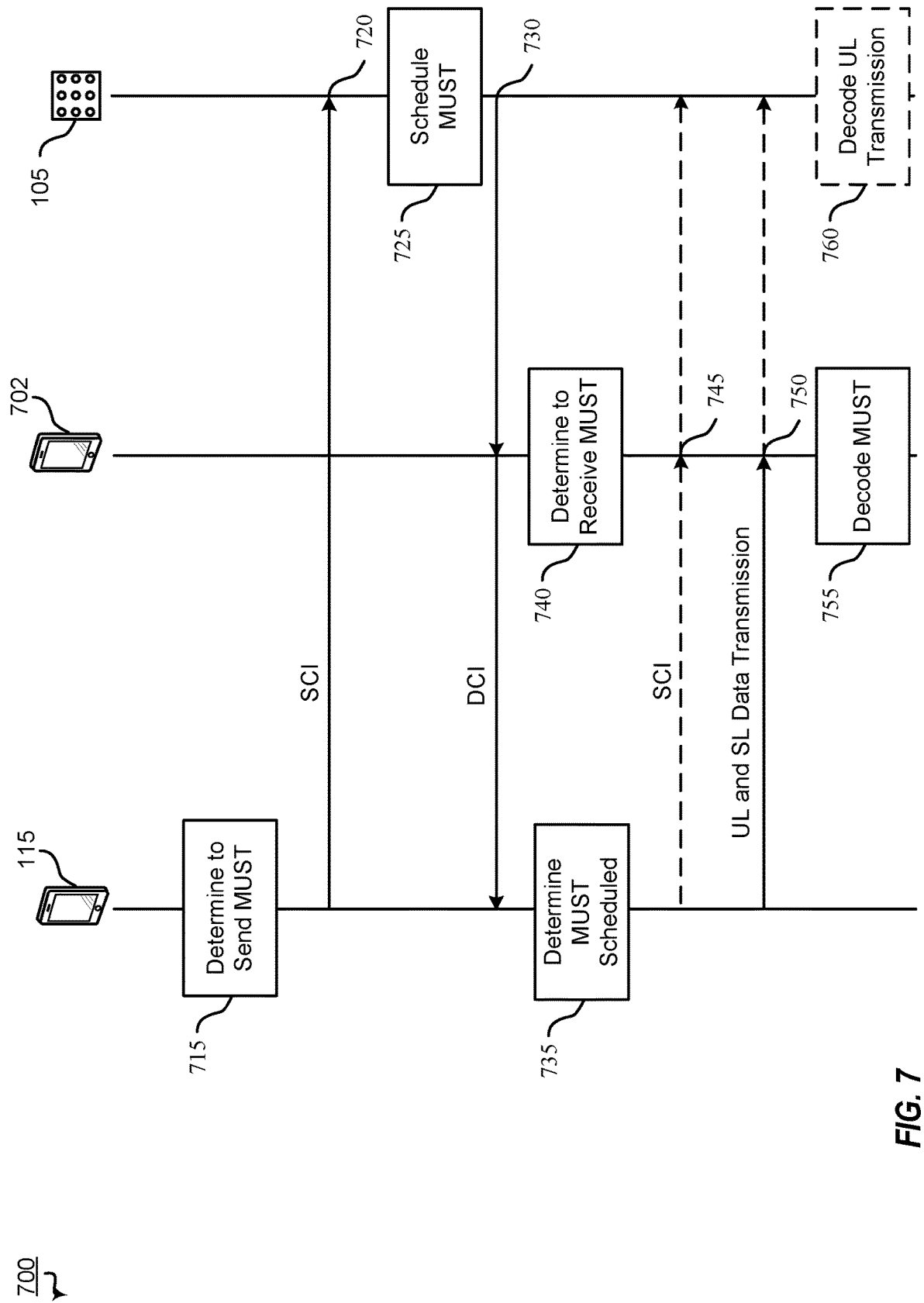
FIG. 7 is a ladder diagram illustrating an example of a process flow for a third example of superposition of sidelink communications and uplink communications.

FIGS. 5-7 illustrate example ladder diagrams for superposition of sidelink and uplink transmission operations. Referring to FIG. 5, FIG. 5 is a ladder diagram of an example of UE based scheduling operations for superposition transmissions. Said another way, a UE schedules superposition transmissions independently from a network (e.g., a base station).

At 510, a base station 105 transmits a downlink control channel transmission, such as a PDCCH transmission, allocating one or more transmission resources. For example, the base station 105 transmits a DCI transmission to a first UE 115 and optionally a second UE 502 which allocates one transmission resource or multiple, repeating transmission resources. To illustrate, the base station 105 may transmit a configured grant which allocates multiple uplink transmission resources for the first UE 115.

At 515, the first UE 115 determines the uplink transmission resources for the first UE 115 based on the downlink control channel transmission. For example, the first UE 115 decodes the DCI transmission to determine a set of uplink transmission resources.

At 520, the first UE 115 determines to perform a superposition transmission for uplink and sidelink transmissions. For example, the first UE 115 determines to perform a MUST for uplink and sidelink transmissions based on determining that the first UE 115 has uplink and sidelink data to send, and optionally based on transmit power differences. To illustrate, the first UE 115 determines that a first transmit power of the uplink channel is greater than a second transmit power of the sidelink channel. In some implementations, the first UE 115 may compare such a transmit power difference to a threshold or offset value to determine that the transmit power difference satisfies a transmit power difference condition. For example, the power for uplink and sidelink may be determined based on path loss between base station and the first UE, and path loss between the second UE and first UE, respectively.

At 525, the first UE 115 generates and transmits a sidelink channel control information. For example, the first UE 115 transmits a SCI (e.g., SCI1 or SCI2) to the second UE 502. The sidelink channel control information (e.g., SCI) may schedule the superposition transmission directly or indirectly. To illustrate, the SCI transmission may schedule the superposition transmission and the second UE 502 may monitor for such a transmission in response to the sidelink channel control information. Alternatively, the sidelink channel control information may request that the base station 105 allocates and/or schedules the superposition transmission, as described further with reference to FIGS. 6 and 7. In some implementations, the base station 105 may also monitor the SCI from the first UE 115 and the base station 105 may receive (e.g., be monitoring for) and decode the SCI.

At 530, the second UE 505 determines to receive a superposition transmission of uplink and sidelink transmissions. For example, the second UE 505 decodes the SCI to determine that the first UE 115 has scheduled the MUST of uplink and sidelink transmissions. To illustrate, the SCI indicates that the MUST transmission is scheduled in a particular transmission resource of an uplink resource pool or a sidelink resource pool.

At 535, the first UE 115 generates and transmits a superposition transmission of uplink and sidelink channel transmissions. For example, the first UE 115 transmits uplink channel data using a first transmit power and sidelink channel data using a second transmit power in a particular transmission resource. To illustrate, the first UE 115 transmits a superposition transmission in a particular uplink pool resource or sidelink pool resource.

At 540, the second UE 502 decodes the uplink transmission of the superposition transmission. For example, the second UE 502 decodes the uplink transmission of the MUST.

At 545, the base station 105 may decode the uplink transmission of the superposition transmission. For example, the base station 105 decodes the uplink transmission of the MUST.

At 550, the second UE 502 decodes the sidelink transmission of the superposition transmission. For example, the second UE 502 decodes the sidelink transmission of the MUST based on the decoding of the uplink transmission of the MUST. To illustrate, the second UE 502 may perform SIC on the sidelink transmission based on the decoding of the uplink transmission to decode the sidelink transmission. Although 540 and 550 are illustrated sequentially in FIG. 5, the decoding of 540 and 550 may occur simultaneously or the UL decoding may be a precursor to the SL decoding.

Additionally, or alternatively, may optionally transmit uplink data using the new beam. For example, responsive to beam update message or independent of the beam update message, the UE 115 may use the new beam to transmit uplink data to the base station 105.

Thus, in the example in FIG. 5, the UE and network entity employ surrounding beam information updates using beam history information stored on the network. That is, the UE provides current beam information to the network and the network may then provide a type of surrounding beam information to the UE.

Referring to FIG. 6, FIG. 6 is a ladder diagram of a first example of network based scheduling operations for superposition transmissions. Said another way, a network entity schedules superposition transmissions responsive to requests from a UE. In the example of FIG. 6, a UE requests a network to schedule a superposition transmission by SCI.

At 615, the first UE 115 determines to perform a superposition transmission for uplink and sidelink transmissions. For example, the first UE 115 determines to perform a MUST for uplink and sidelink transmissions based on determining that the first UE 115 has uplink and sidelink data to send, and optionally based on transmit power differences. To illustrate, the first UE 115 determines that a first transmit power of the uplink channel is greater than a second transmit power of the sidelink channel. In some implementations, the first UE 115 may compare such a transmit power difference to a threshold or offset value to determine that the transmit power difference satisfies a transmit power difference condition.

At 620, the first UE 115 generates and transmits an uplink channel control information. For example, the first UE 115 transmits a UCI to the base station 105. The uplink channel control information (e.g., UCI) may request for scheduling of superposition transmission directly or indirectly. To illustrate, the UCI transmission may indicate a resource scheduled for the superposition transmission; additionally, the base station 105 may indicate the resource to the second UE 602, such as by DCI Alternatively, the uplink channel control information (UCI) may only request that the base station 105 allocates and/or schedules the superposition transmission. In other implementations, the first UE 115 may transmit sidelink control channel information (e.g., a SCI) in addition to or in the alternative of the UCI, as described further with reference to FIG. 7.

At 625, the base station 105 schedules a superposition transmission of uplink and sidelink transmission based on the uplink channel information (UCI). For example, the base station 105 schedules a MUST transmission for a particular transmission resource indicated by the UCI. The particular transmission resource may be a resource in a sidelink resource pool that has been selected by the UE. Additionally, or alternatively, the particular transmission resource may be allocated by the base station upon receipt of the UCI requesting for supposition transmission, from the resources that are available for uplink transmission (i.e., out of sidelink resource pools).

At 630, the base station 105 generates and transmits a downlink control channel information transmission (e.g., DCI) indicating the super transmission. For example, the base station 105 transmits a DCI which signals or schedules the MUST of uplink and sidelink channel transmissions.

At 635, the first UE 115 determines that a superposition transmission of uplink and sidelink transmissions has been scheduled. For example, the first UE 115 decodes the DCI to determine that the base station 105 has scheduled the MUST of uplink and sidelink transmissions requested by the first UE 115. To illustrate, the DCI indicates that the MUST transmission is scheduled in a particular transmission resource of an uplink resource pool or a sidelink resource pool.

At 640, the first UE 115 may optionally transmit sidelink control channel information. For example, the first UE 115 may transmit a SCI which indicates that it will be transmitting the base station 105 scheduled MUST transmission in the particular transmission resources. To illustrate, the first UE 115 may transmit an "acknowledgment" of sorts for the MUST scheduled by the base station 105. Alternatively, the first UE 115 may transmit a SCI which indicates a particular transmission resource from among a set of transmission resources allocated by the base station 105. In other implementations, the DCI transmission from the base station 105 may only indicate approval from MUST operations in general, and the first UE 115 may schedule the MUST operation by the SCI that it will be transmitting in a particular MUST in a particular transmission resource identified by the SCI.

At 645, the second UE 505 determines to receive a superposition transmission of uplink and sidelink transmissions. For example, the second UE 505 decodes the DCI to determine that the base station 105 has scheduled the MUST of uplink and sidelink transmissions to be sent by the first UE 115. To illustrate, the DCI indicates that the MUST transmission is scheduled in a particular transmission resource of an uplink resource pool or a sidelink resource pool. Additionally or alternatively, the first UE 115 transmits an SCI to the second UE 505 indicating the superposition transmission.

At 650, the first UE 115 generates and transmits a superposition transmission of uplink and sidelink channel transmissions. For example, the first UE 115 transmits uplink channel data using a first transmit power and sidelink channel data using a second transmit power in a particular transmission resource. To illustrate, the first UE 115 transmits a NOMA transmission in a particular uplink pool resource or sidelink pool resource.

At 655, the second UE 502 decodes the uplink and sidelink transmissions of the superposition transmission. For example, the second UE 502 decodes the uplink transmission of the MUST; then the second UE 502 decodes the sidelink transmission of the MUST. To illustrate, the second UE 502 decodes the sidelink transmission of the MUST based on the decoding of the uplink transmission of the MUST. In some implementations, the second UE 502 may perform SIC on the sidelink transmission based on the decoding of the uplink transmission to decode the sidelink transmission At 660, the base station 105 may decode the uplink transmission of the superposition transmission. For example, the base station 105 decodes the uplink transmission of the MUST.

As compared to the example in FIG. 5, which uses UE based scheduling, the example of FIG. 6 employs network based scheduling. That is, the network schedules or approves the superposition transmission responsive to a UE request.

Referring to FIG. 7, FIG. 7 is a ladder diagram of another example of network based scheduling operations for superposition transmissions. Said another way, a network entity schedules superposition transmissions responsive to requests from a UE. In the example of FIG. 7, a UE requests a network to schedule a superposition transmission by UCI.

At 715, the first UE 115 determines to perform a superposition transmission for uplink and sidelink transmissions. For example, the first UE 115 determines to perform a MUST for uplink and sidelink transmissions based on determining that the first UE 115 has uplink and sidelink data to send, and optionally based on transmit power differences. To illustrate, the first UE 115 determines that a first transmit power of the uplink channel is greater than a second transmit power of the sidelink channel. In some implementations, the first UE 115 may compare such a transmit power difference to a threshold or offset value to determine that the transmit power difference satisfies a transmit power difference condition.

At 720, the first UE 115 generates and transmits an uplink channel control information. For example, the first UE 115 transmits a UCI to the base station 105. The uplink channel control information (e.g., UCI) may request for scheduling of superposition transmission directly or indirectly. To illustrate, the UCI transmission may indicate a resource scheduled for the superposition transmission; additionally, the base station 105 may indicate the resource to the second UE 702, such as by DCI Alternatively, the uplink channel control information (UCI) may only request that the base station 105 allocates and/or schedules the superposition transmission. In other implementations, the first UE 115 may transmit sidelink control channel information (e.g., a SCI) in addition to or in the alternative of the UCI, as described further with reference to FIG. 7.

At 725, the base station 105 schedules a superposition transmission of uplink and sidelink transmission based on the uplink channel information (UCI). For example, the base station 105 schedules a MUST transmission for a particular transmission resource indicated by the UCI. The particular transmission resource may be a resource in a sidelink resource pool that has been selected by the UE. Additionally, or alternatively, the particular transmission resource may be allocated by the base station upon receipt of the UCI requesting for supposition transmission, from the resources that are available for uplink transmission (i.e., out of sidelink resource pools).

At 730, the base station 105 generates and transmits a downlink control channel information transmission (e.g., DCI) indicating the superposition transmission. For example, the base station 105 transmits a DCI which signals or schedules the MUST of uplink and sidelink channel transmissions.

At 735, the first UE 115 determines that a superposition transmission of uplink and sidelink transmissions has been scheduled. For example, the first UE 115 decodes the DCI to determine that the base station 105 has scheduled the MUST of uplink and sidelink transmissions requested by the first UE 115. To illustrate, the DCI indicates that the MUST transmission is scheduled in a particular transmission resource of an uplink resource pool or a sidelink resource pool.

At 740, the second UE 505 determines to receive a superposition transmission of uplink and sidelink transmissions. For example, the second UE 505 decodes the DCI to determine that the base station 105 has scheduled the MUST of uplink and sidelink transmissions to be sent by the first UE 115. To illustrate, the SCI indicates that the MUST transmission is scheduled in a particular transmission resource of an uplink resource pool or a sidelink resource pool. Additionally or alternatively, the first UE 115 transmits an SCI to the second UE 505 indicating the superposition transmission At 745, the first UE 115 may optionally transmit sidelink control channel information. For example, the first UE 115 may transmit a SCI which indicates that it will be transmitting the base station 105 scheduled MUST transmission in the particular transmission resources. To illustrate, the first UE 115 may transmit an "acknowledgment" of sorts for the MUST scheduled by the base station 105. Alternatively, the first UE 115 may transmit a SCI which indicates a particular transmission resource from among a set of transmission resources allocated by the base station 105. In other implementations, the DCI transmission from the base station 105 may only indicate approval from MUST operations in general, and the first UE 115 may schedule the MUST operation by the SCI that it will be transmitting in a particular MUST in a particular transmission resource identified by the SCI.

At 750, the first UE 115 generates and transmits a superposition transmission of uplink and sidelink channel transmissions. For example, the first UE 115 transmits uplink channel data using a first transmit power and sidelink channel data using a second transmit power in a particular transmission resource. To illustrate, the first UE 115 transmits a NOMA transmission in a particular uplink pool resource or sidelink pool resource.

At 755, the second UE 502 decodes the uplink and sidelink transmissions of the superposition transmission. For example, the second UE 502 decodes the uplink transmission of the MUST; then the second UE 502 decodes the sidelink transmission of the MUST. To illustrate, the second UE 502 decodes the sidelink transmission of the MUST based on the decoding of the uplink transmission of the MUST. In some implementations, the second UE 502 may perform SIC on the sidelink transmission based on the decoding of the uplink transmission to decode the sidelink transmission At 760, the base station 105 may optionally decode the uplink transmission of the superposition transmission. For example, the base station 105 decodes the uplink transmission of the MUST.

As compared to the example in FIG. 6, which uses an uplink channel for network based scheduling, the example of FIG. 7 employs a sidelink channel based network scheduling. That is, the network monitors sidelink channel resources and receives a SCI which requests a superposition transmission. Particular devices may be set to operate in one superposition transmission mode depending on hardware capabilities or may switch between the superposition transmission modes of FIGS. 4-7 based on one or more conditions or inputs.

Additionally, or alternatively, one or more operations of FIGS. 4-7 may be added, removed, substituted in other implementations. For example, the UCI of FIG. 6 may be used in place of or in addition to the SCI of FIG. 7.

Figure 10:
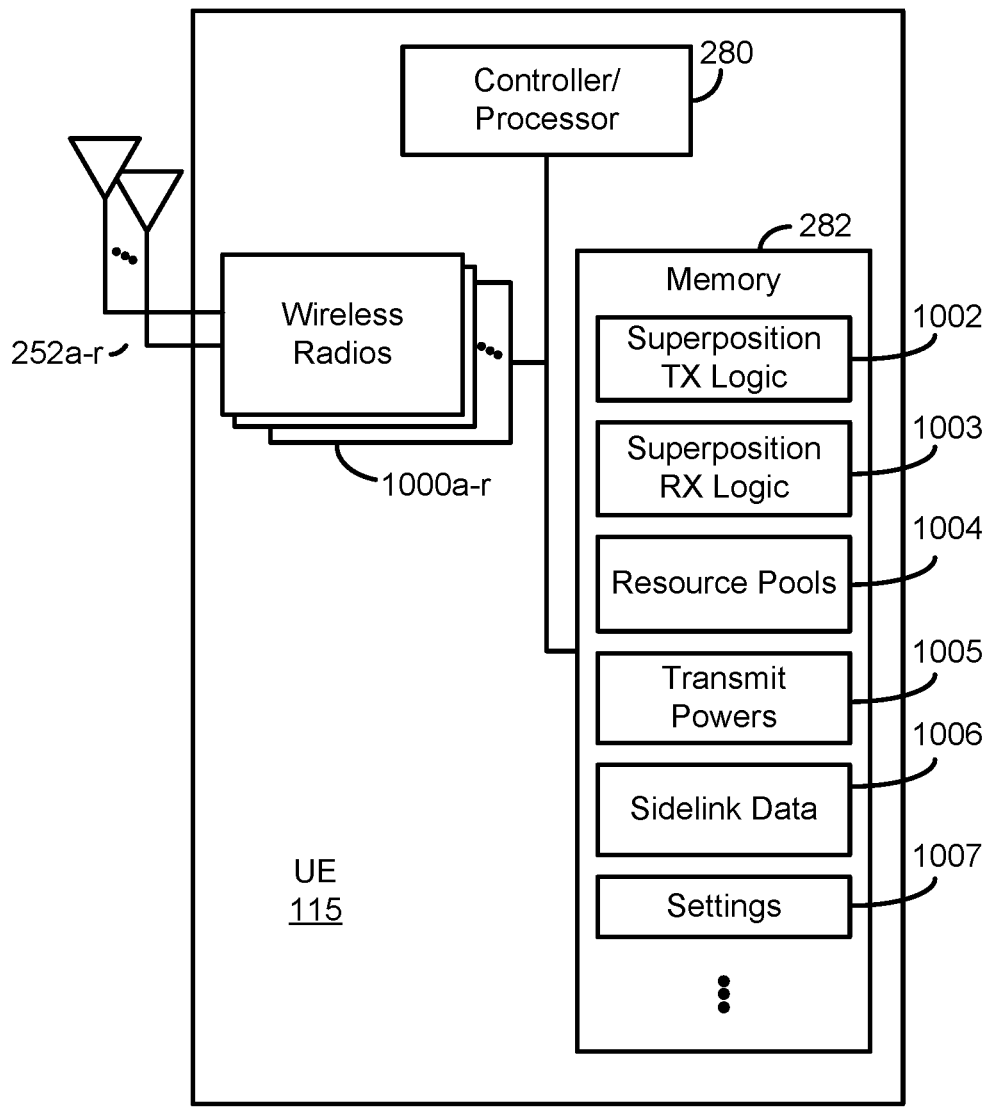
FIG. 10 is a block diagram conceptually illustrating a design of a UE configured to perform precoding information update operations according to some embodiments of the present disclosure.

FIG. 8 is a flow diagram illustrating example blocks executed by a UE configured according to an aspect of the present disclosure. The example blocks will also be described with respect to UE 115 as illustrated in FIG. 10. FIG. 10 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1000a-r and antennas 252a-r. Wireless radios 1000a-r includes various components and hardware, as illustrated in FIG. 2 for UE 115, including modulator/demodulators 254a-r, MIMO detector 256, receive processor 258, transmit processor 264, and TX MIMO processor 266. As illustrated in the example of FIG. 10, memory 282 stores superposition TX logic 1002, superposition RX logic 1004, resource pools data 904, transmit powers data 1005, sidelink data 1006, and settings data 1007.

At block 800, a wireless communication device, such as a UE, receives a downlink control signaling scheduling one or more uplink transmissions for one or more transmission resources. For example, the UE 115 receives a downlink channel control transmission (e.g., PDCCH), such as a DCI, signaling an uplink grant with one or more uplink grant resources, as described with reference to FIGS. 4-7.

At block 801, the UE 115 determines to perform superposition transmission operations for at least one transmission resource of the one or more transmission resources. For example, the UE 115 determines to perform superposition of UL and SL data based on a transmit power difference between the uplink and sidelink channels, as described with reference to FIGS. 4-7.

At block 802, the UE 115 transmits an uplink channel data transmission and a sidelink channel data transmission in a same transmission resource, responsive to determining to perform superposition transmission operations for the least one transmission resource. For example, the UE 115 transmits a PUSCH transmission and a PSSCH transmission in the same transmission resource, as described with reference to FIGS. 4-7.

The UE 115 may execute additional blocks (or the UE 115 may be configured further perform additional operations) in other implementations. For example, the UE 115 may perform one or more operations described above.

Accordingly, a UE and a base station may perform superposition transmission operations. By performing superposition transmission operations, throughput may be increased and latency may be reduced.

FIG. 9 is a flow diagram illustrating another example of blocks executed by wireless communication device configured according to another aspect of the present disclosure. The example blocks will also be described with respect to UE 115 as illustrated in FIG. 10 and described with reference to FIG. 8.

At block 900, a wireless communication device, such as a UE, receives a control transmission indicating a superposition transmission. For example, the UE 115 receives a downlink channel control transmission or a, as described with reference to FIGS. 4-7. The PUR configuration data may indicate a PUR configuration indicator or index number, or may include data for settings of the PUR configurations, such as number transmit occasions, transmit occasions per opportunity, periodicity, per configuration type, etc., or a combination thereof. After the PUR configuration is set, the UE 115 may transmit small data transmissions in PUSCH resources configured and allotted by the PUR configuration.

At block 901, the UE 115 determines to perform superposition transmission reception operations for at least one transmission resource based on the control transmission. For example, the UE 115 determines to release an active PUR configuration indicated by a network based on one or more UE monitored release conditions, as described with reference to FIGS. 4-7.

At block 902, the UE 115 receives an uplink channel data transmission and a sidelink channel data transmission in a same transmission resource, responsive to determining to perform superposition transmission reception operations for the least one transmission resource. For example, the UE 115 (e.g., third device 401) receives a superposition transmission including a PUSCH transmission and a PSSCH transmission, as described with reference to FIGS. 4-7.

Accordingly, a UE and a base station may perform superposition transmission operations. By performing superposition transmission operations, throughput may be increased and latency may be reduced.

Figure 11:
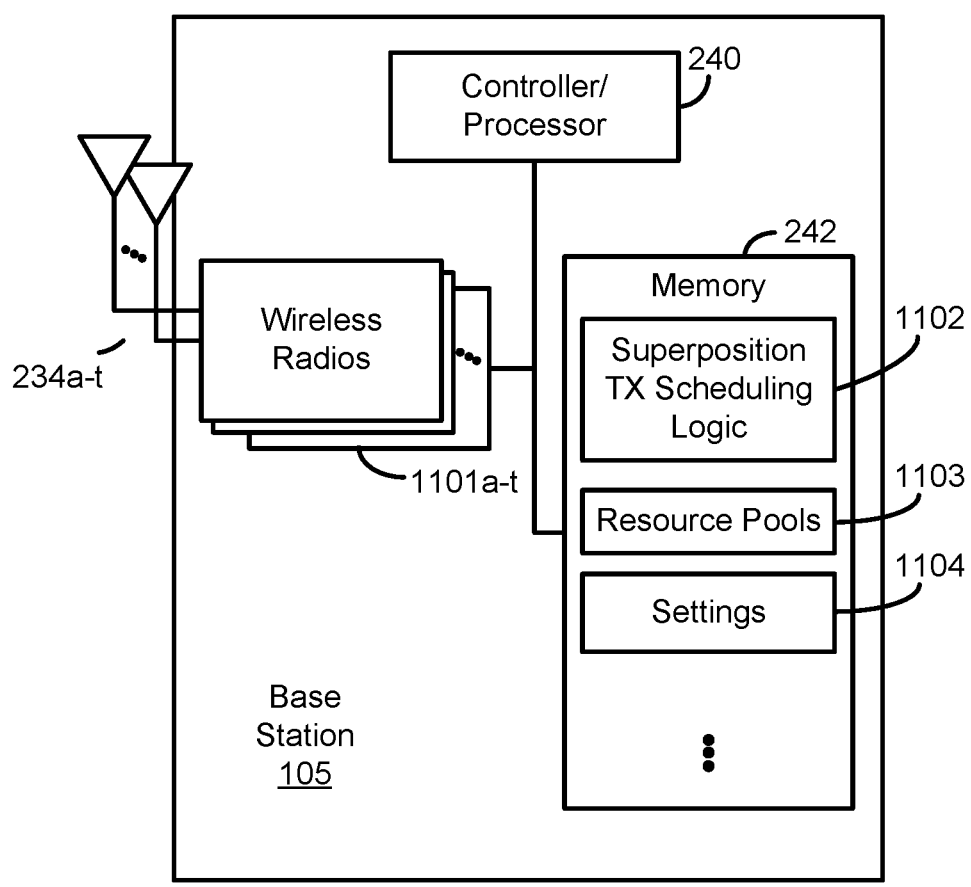
FIG. 11 is a block diagram conceptually illustrating a design of a base station configured to perform precoding information update operations according to some embodiments of the present disclosure.

FIG. 11 is a flow diagram illustrating example blocks executed by wireless communication device configured according to another aspect of the present disclosure. The example blocks will also be described with respect to base station 105 (e.g., gNB) as illustrated in FIG. 11. FIG. 11 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1101a-t and antennas 234a-t. Wireless radios 1101a-t includes various components and hardware, as illustrated in FIG. 2 for base station 105, including modulator/demodulators 232a-t, MIMO detector 236, receive processor 238, transmit processor 220, and TX MIMO processor 230. As illustrated in the example of FIG. 11, memory 242 stores superposition TX scheduling logic 1002, resource pools data 1003, and settings data 1104. One of more of 1102-1104 may include or correspond to one of 1002-1007.

A wireless communication device, such as a base station, receives a control transmission indicating a superposition transmission can be performed. For example, the base station 105 receives an uplink control message or a sidelink control message indicating a a superposition transmission, as described with reference to FIGS. 4-7.

The base station 105 transmits a downlink control transmission scheduling the superposition transmission for an uplink channel data transmission and a sidelink channel data transmission in a same transmission resource. For example, the base station 105 transmits a DCI scheduling or granting a scheduling request for a superposition transmission of UL and SL data, as described with reference to FIGS. 4-7.

The base station 105 may execute additional blocks (or the base station 105 may be configured further perform additional operations) in other implementations. For example, the base station 105 may perform one or more operations described above, including such actions as described in FIG. 7 and as attributed to the UE 115. As another example, the base station 105 may perform one or more aspects described below and/or with reference to FIG. 7.

In a first aspect, the uplink channel data transmission and the sidelink channel data transmission are scheduled in a sidelink channel resource.

In a second aspect, alone or in combination with one or more of the above aspects, the control transmission indicating the superposition transmission further requests the network entity to schedule the uplink transmission in a sidelink channel resource previously allocated to the UE for sidelink transmission.

In a third aspect, alone or in combination with one or more of the above aspects, the control transmission received is a sidelink control transmission.

In a fourth aspect, alone or in combination with one or more of the above aspects, the control transmission received is an uplink control transmission.

In a fifth aspect, alone or in combination with one or more of the above aspects, the downlink control transmission schedules the superposition transmission for the uplink channel data transmission and the sidelink channel data transmission the same transmission resource.

In a sixth aspect, alone or in combination with one or more of the above aspects, the base station 105 receives a sidelink channel control transmission scheduling the sidelink channel data transmission.

In a seventh aspect, alone or in combination with one or more of the above aspects, the sidelink channel control transmission is sent in a sidelink channel resource (e.g., a SL channel resource of a prior slot).

In an eighth aspect, alone or in combination with one or more of the above aspects, the base station 105 monitors a particular transmission resource based on the downlink control transmission, receives the uplink channel data transmission in the particular transmission resource, and processes the uplink channel data transmission.

In a ninth aspect, alone or in combination with one or more of the above aspects, the base station 105 monitors a particular transmission resource based on the downlink control transmission, receives the uplink channel data transmission and the sidelink channel data transmission in the particular transmission resource, processes the uplink channel data transmission, and refrains from processing the sidelink channel data transmission.

In a tenth aspect, alone or in combination with one or more of the above aspects, prior to receiving the control transmission, the base station 105 transmits a second downlink control signaling scheduling an uplink grant for one or more transmission resources, the one or more transmission resources including the same transmission resource.

Accordingly, a UE and a base station may perform superposition transmission operations. By performing superposition transmission operations, throughput may be increased and latency may be reduced.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 8 and 9 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
   receiving, by a user equipment (UE), a downlink control signaling scheduling one or more uplink transmissions in one or more transmission resources;
   determining, by the UE, to perform superposition transmission operations for at least one transmission resource of the one or more transmission resources;
   transmitting, by the UE, a sidelink channel control transmission indicating a superposition transmission responsive to determining to perform superposition transmission operations for the at least one transmission resource; and
   transmitting, by the UE, an uplink channel data transmission and a sidelink channel data transmission in a same transmission resource of the one or more transmission resources, responsive to the sidelink channel control transmission.

2. The method of claim 1, wherein the uplink channel data transmission and the sidelink channel data transmission comprise the superposition transmission.

3. The method of claim 1, wherein an uplink channel corresponding to the uplink channel data transmission has a higher transmission power than a transmission power of a sidelink channel corresponding to the sidelink channel data transmission.

4. The method of claim 1, wherein the sidelink channel data transmission is scheduled by the UE.

5. The method of claim 1, further comprising:
   determining to schedule, by the UE, the sidelink channel data transmission in one or multiple of the one or more transmission resources, and wherein transmitting the sidelink channel control transmission includes:
   transmitting, by the UE, the sidelink channel control transmission scheduling the superposition transmission.

6. The method of claim 5, wherein the sidelink channel control transmission is transmitted in a sidelink channel resource.

7. The method of claim 1, wherein the uplink channel data transmission and the sidelink channel data transmission are transmitted in an uplink channel resource.

8. The method of claim 1, wherein the uplink channel data transmission and the sidelink channel data transmission are scheduled by a network entity.

9. The method of claim 1, further comprising:
   transmitting, by the UE, an uplink channel control transmission indicating that the UE requests to use superposition transmission; and
   receiving, by the UE, a second downlink control signaling scheduling the uplink channel data transmission and the sidelink channel data transmission.

10. The method of claim 9, wherein transmitting the sidelink channel control transmission includes:
    transmitting, by the UE, the sidelink channel control transmission indicating the uplink channel data transmission and the sidelink channel data transmission comprise the superposition transmission.

11. An apparatus configured for wireless communication, comprising:
    at least one processor; and
    a memory coupled to the at least one processor,
    wherein the at least one processor is configured to:
    receive, by a user equipment (UE), a downlink control signaling scheduling one or more uplink transmissions for one or more transmission resources;
    determine, by the UE, to perform superposition transmission operations for at least one transmission resource of the one or more transmission resources;
    transmit, by the UE, a sidelink channel control transmission indicating a superposition transmission responsive to determining to perform superposition transmission operations for the at least one transmission resource; and
    transmit, by the UE, an uplink channel data transmission and a sidelink channel data transmission in a same transmission resource of the one or more transmission resources, responsive to the sidelink channel control transmission.

12. The apparatus of claim 11, wherein the uplink channel data transmission and the sidelink channel data transmission are transmitted in a sidelink channel resource.

13. The apparatus of claim 11, wherein determining to perform the superposition transmission operations includes:
    determining, by the UE, that the UE has both uplink and sidelink traffic to send; and
    determining, by the UE, that a difference of transmission powers for uplink and sidelink channels is greater than a threshold, the uplink channel corresponding to the uplink channel data transmission and the sidelink channel corresponding to the sidelink channel data transmission.

14. The apparatus of claim 13, wherein determining to perform the superposition transmission operations further includes:
    determining that the sidelink traffic, the uplink traffic, or both, may be transmitted in an uplink resource.

15. The apparatus of claim 13, wherein determining to perform the superposition transmission operations further includes:
    determining that the sidelink traffic, the uplink traffic, or both, may be transmitted in a sideline resource of a sidelink resource pool.

16. The apparatus of claim 13, wherein determining that transmission powers for the uplink and sidelink channels are different includes:
    determining, by the UE, a uplink transmit power for the uplink channel;
    determining, by the UE, a sidelink transmit power for the sidelink channel;
    determining, by the UE, a transmit power difference based on the uplink transmit power and the sidelink transmit power; and
    comparing the transmit power difference to a threshold to determine if the transmit power difference exceeds the threshold, wherein the UE determines to perform the superposition transmission operations based on the transmit power difference exceeding the threshold.

17. The apparatus of claim 11, further comprising, prior to receiving the downlink control signaling, transmitting, by the UE, a capabilities message indicating that the UE is configured for superposition of sidelink and uplink transmissions.

18. The apparatus of claim 11, further comprising, prior to receiving the downlink control signaling, receiving, by the UE from a second UE, a capabilities message indicating that the second UE is capable of superposition of sidelink and uplink transmissions.

19. The apparatus of claim 11, further comprising, prior to receiving the downlink control signaling, receiving, by the UE, a configuration message from a network entity indicating a superposition of sidelink and uplink transmission mode.

20. A method of wireless communication comprising:
    receiving, by a user equipment (UE) from a second UE, a sidelink channel control transmission indicating a superposition transmission;
    determining, by the UE, to perform superposition transmission reception operations for at least one transmission resource based on the sidelink channel control transmission; and
    receiving, by the UE, an uplink channel data transmission and a sidelink channel data transmission in a same transmission resource, responsive to determining to perform superposition transmission reception operations for the at least one transmission resource.

21. The method of claim 20, wherein the sidelink channel control transmission indicates that the uplink channel data transmission and the sidelink channel data transmission comprise the superposition transmission.

22. The method of claim 20, further comprising:
    receiving, by the UE from a network entity, a downlink channel control transmission scheduling the uplink channel data transmission and the sidelink channel data transmission of the superposition transmission.

23. The method of claim 20, further comprising:
    receiving, by the UE from a network entity, a downlink channel control transmission indicating the uplink channel data transmission and the sidelink channel data transmission comprise the superposition transmission, wherein the sidelink channel control transmission schedules the uplink channel data transmission and the sidelink channel data transmission of the superposition transmission.

24. The method of claim 20, wherein the sidelink channel control transmission further schedules the superposition transmission, and the method further comprising performing superposition transmission detection operations responsive to the sidelink channel control transmission.

25. An apparatus configured for wireless communication, comprising:
    at least one processor; and
    a memory coupled to the at least one processor,
    wherein the at least one processor is configured to:
        receive, by a user equipment (UE) from a second UE, a sidelink channel control transmission indicating a superposition transmission;
        determine, by the UE, to perform superposition transmission reception operations for at least one transmission resource based on the sidelink channel control transmission; and
        receive, by the UE, an uplink channel data transmission and a sidelink channel data transmission in a same transmission resource, responsive to determining to perform superposition transmission reception operations for the at least one transmission resource.

26. The apparatus of claim 25, further comprising:
    decoding the uplink channel data transmission; and
    decoding the sidelink channel data transmission based on the decoding of the uplink channel data transmission.

27. The apparatus of claim 26, wherein decoding the sidelink channel data transmission includes:
    performing successive interference cancellation (SIC) on the sidelink channel data transmission based on the decoding of the uplink channel data transmission.

28. The method of claim 1, wherein the sidelink channel control transmission is a scheduling transmission to schedule the superposition transmission and transmitted to another UE or is a scheduling request transmission including a request to schedule the superposition transmission and transmitted to a network entity.

29. The method of claim 1, wherein determining to perform the superposition transmission operations further includes:
    determining that the uplink channel data transmission and the sidelink channel data transmission may be transmitted in the same transmission resource based on transmission power, transmission distance, orthogonality, or a combination thereof.

30. The apparatus of claim 11, wherein the UE determines to perform the superposition transmission operations independent of a notification from a network entity.

\* \* \* \* \*